United States Patent [19]

Uchiyama

[11] 3,747,327

[45] July 24, 1973

[54] WATCHDIAL STRUCTURE INCORPORATING ELECTRICAL DEVICES

[75] Inventor: Hideaki Uchiyama, Nagano-ken, Suwa-shi, Japan

[73] Assignee: Kabushiki Kaisha Suwa Seikosha, Tokyo, Japan

[22] Filed: Dec. 27, 1971

[21] Appl. No.: 212,449

[30] Foreign Application Priority Data

Dec. 29, 1970 Japan .............................. 45/128127

Dec. 29, 1970 Japan .............................. 45/141704

[52] U.S. Cl. .............. 58/23 R, 58/23 BA, 58/126 R

[51] Int. Cl. .............................................. G04c 3/00

[58] Field of Search ........................ 29/451, 177, 52, 29/6; 250/200, 211 R, 239; 58/23 BA, 23 R; 174/52 S, 52 R; 317/101 DH, 101 CP, 101 CC, 101 G, 101 A, 235, 234 P; 136/206

[56] References Cited

UNITED STATES PATENTS

| | | | |
|---|---|---|---|
| 1,892,104 | 12/1932 | Hunter | 29/451 |
| 2,056,024 | 9/1934 | Stuart | 29/451 |
| 2,402,662 | 6/1946 | Ohl | 317/235 N X |
| 2,875,308 | 2/1959 | Tarbes | 250/239 X |
| 2,928,950 | 3/1960 | Myer | 317/235 N X |
| 3,118,086 | 1/1964 | Knochel et al. | 174/52 PE |
| 3,182,415 | 5/1965 | Brooks | 317/235 N X |
| 3,293,738 | 12/1966 | Caldwell et al. | 29/451 |
| 3,369,124 | 2/1968 | Dueker | 317/235 N X |
| 3,427,797 | 2/1969 | Kimura et al. | 58/23 BA |
| 3,430,054 | 2/1969 | Klein | 317/235 N X |

*Primary Examiner*—Richard B. Wilkinson

*Assistant Examiner*—U. Weldon

*Attorney*—Alex Friedman, Harold I. Kaplan et al.

[57] ABSTRACT

The space required for electrical connections in small wrist watches incorporating electrical devices such as photo-electric elements or display elements is substantially reduced by the use of stressed metal members making firm contact with each other rather than conventional wiring and solder. This construction simplifies assembly of such watches and makes it easy to break and restore the electrical connections in the event that repair of such timepieces becomes necessary.

5 Claims, 9 Drawing Figures

WATCHDIAL STRUCTURE INCORPORATING ELECTRICAL DEVICES

BACKGROUND OF THE INVENTION

In small timepieces such as wrist watches where a solar battery is used as an energy source or when electric display items such as photo-electric diodes or liquid crystals are used, electrical connections have been formed of lead wires joined to electrodes by means of soldering or welding. Soldering and welding techniques are difficult to use where the members being joined are small and close together. Moreover, the procedure is costly, time-consuming, unsuitable for mass-production and produces connections which are not as reliable as could be desired. Also, it is difficult to repair such conventionally-made watches owing to the large number of wired connections which must first be broken and then replaced.

SUMMARY OF THE INVENTION

In a small timepiece such as a wrist watch containing electrical devices such as solar cells, or electrical displays effective and reliable contacts for the small currents involved, are obtained by pressing metal members together. One or both contact members forming a connection may be metal films on insulating substrates, the substrates being pressed together at their metal surfaces by elastic members.

Accordingly, an object of the present invention is to provide improved connections of small size for use in small timepieces.

Another object of the present invention is to provide improved connections in small timepieces where the connections are effective and reliable. 2

Yet another object of the present invention is to provide improved electrical connections for use in small timepieces, said connections being readily and easily broken and then replaced in the event that repair of said timepiece becomes necessary.

A further object of the present invention is to provide improved electrical connections for use in small timepieces where the cost of such connections is low and where the connections are suitable for mass-production with high reliability.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
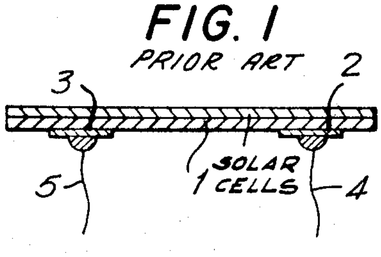
FIG. 1 PRIOR ART
FIG. 1 is a sectional view of a watch dial with electrical connections of conventional construction.

Conventionally, where solar cells are to be used in small timepieces such as wrist watches, the construction is generally as shown in FIG. 1 where solar cell 1 having terminals 2 and 3 is joined to wires 4 and 5 by means of solder and welds. As aforenoted, the small size of the solar cells makes it difficult to carry out such operations reliably and by procedures which are suitable for mass-production at low cost.

Figure 2:
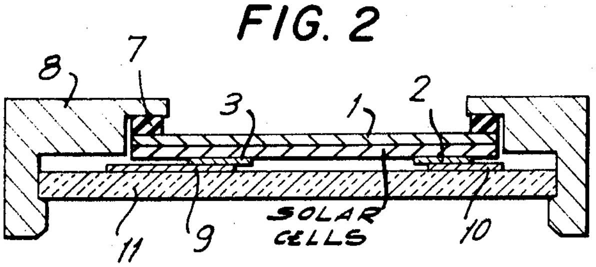
FIG. 2 is a vertical section of a watch dial mounted in a timepiece in accordance with the present invention.
Figure 3:
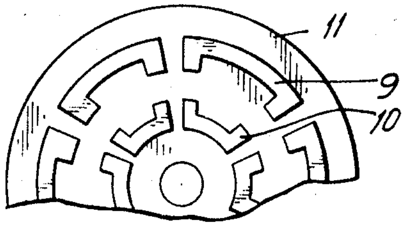
FIG. 3 is an arrangement of metal film electrodes on an insulating surface in accordance with the present invention.

A method of making electrical contact with a display element or solar cell which is part of a solar battery is shown in FIG. 2 where display element 1 having terminals 2 and 3 makes contact with conductive films 9 and 10 on an insulating base. Elastic member 7 is inserted between electrical element 1 and frame 8. Elastic member 7 may be of a rubber-like material or a wave-shaped plate spring. Advantageously, deposited metal films 9 and 10 may have special shapes such as shown in FIG. 3. Frame 8 may be fixed to base plate 11 as shown in FIG. 2 or may be held thereto by means of a small screw (not shown). As is evident, such a type of construction is reliable, especially since the currents to be carried are extremely small, and the preparation and assembly of such elements are well suited for mass-production.

Figure 4:
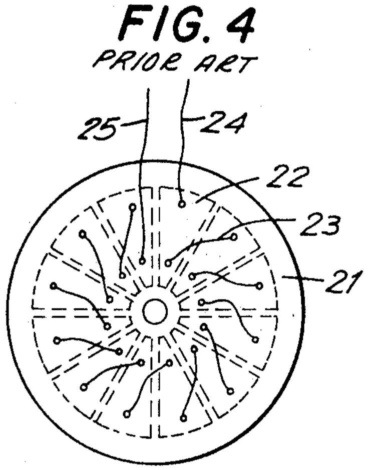
FIG. 4 PRIOR ART
FIG. 4 is a plan view of a timepiece having a solar cell battery wired in accordance with the prior art.

Assembly of solar cells such as shown in FIG. 1 into a battery using prior art means of connecting said solar cells is shown in FIG. 4 where solar cells 22 are connected by wires 25 to each other. The solar cells are attached to base plates 21. Leads to other parts of the electrical system are shown as wires 24 and 25. As is evident, replacement of the dial or of the solar cell battery requires much soldering and unsoldering and involves a great deal of hand labor at substantial cost.

Figure 5:
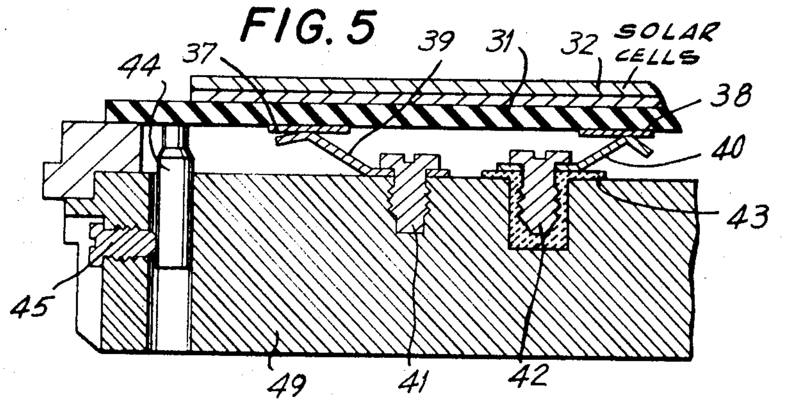
FIG. 5 is a partial section showing stressed metal electrodes making contact with metal film electrodes.
Figure 6:
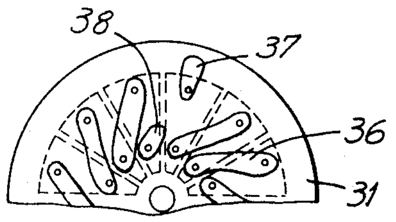
FIG. 6 is a partial plan view of a timepiece with a solar cell battery wired in accordance with the present invention.

An improved construction in accordance with the present invention is shown in FIGS. 5 and 6 where 31 is a non-conductive dial on the surface of which a solar battery 32 is disposed. The solar cells are connected in series by conductive metallic films 36 on the back side of the dial. Terminals 37 and 38 of the solar battery are also formed as metallic film deposits on the back side of dial 31. Connection to these terminals is made by means of flexible metallic members 39 and 40 which are held to base plate 49 by screws 41 and 42. Base plate 49 is conductive, so screw 42 is inserted in non-conductive insulating member 43. Dial 31 is held to base plate 49 by means of foot 44 integral with plate 31. Foot 44 is held in base plate 49 by means of set screw 45. As is evident, screws 41 and 42 need not necessarily be fixed to base plate 49 but could make contact with other electrical elements of the system by means of a bridge or other means (not shown).

As is evident from the construction shown in FIG. 5, the dial 31 in the solar battery 32 can easily be removed from base plate 49 by loosening set screw 45. This type of construction makes it very simple to assemble and take part for repair watches constructed as shown. The construction, consequently, is most suitable for mass-production to give a product of high reliability and low cost.

Figure 7A:
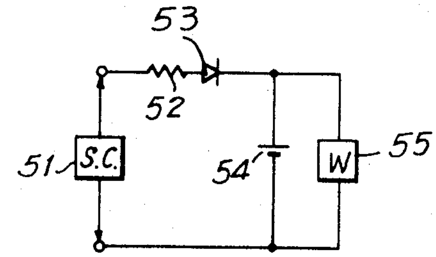
FIG. 7*a* is a circuit diagram of a preferred embodiment of the present inventions.

Preferred circuit diagrams for the timepiece described above are shown in FIG. 7*a* and FIG. 7*b*. One end of said cells 51 is shown in FIG. 2 as terminal 2, and in FIG. 5 as terminal 37. The other end of said cells 51 is shown in FIG. 2 as terminal 3, and in FIG. 5 as terminal 31. Photoelectric element 51 (FIG. 7*a*) is removably connected to battery 54 through diode 53 and current-limiting resistor 52 by the structure shown in FIG. 5. Box 55 indicates a watch movement driven by solar cell 51.

Figure 7B:
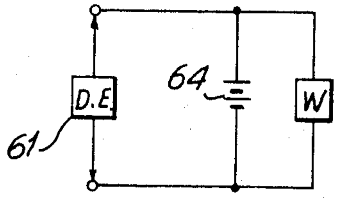
FIG. 7*b* is a circuit diagram illustrating how display elements are connected in a timepiece in accordance with the present invention.
Figure 8:
FIG. 8 is a wave plate which serves as a biasing means.

In FIG. 7*b* a display element 61, in place of said photoelectric element, is removably connected to battery 64 by the above mentioned structure of the watch dial.

It will thus be seen that the objects set forth above, among those made apparent from the preceding description, are efficiently attained and since, certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved watch structure having a frame and removable electrical connection between electrical elements on a dial and a watch movement in a watch, said elements having terminals on the inner surface of said dial, a watch movement including electrical circuitry, said circuitry having terminals disposed proximate to and opposed to said elements terminals and biasing means between the outer surface of said dial and said frame establishing firm, removable contact between said elements terminals and said circuitry terminals.

2. The improved watch structure as defined in claim 1 wherein said biasing means is an elastomer.

3. The improved watch structure as defined in claim 1 wherein said biasing means is a wave plate.

4. The improved watch structure as defined in claim 1 wherein said elements are a plurality of solar cells, separate metallic films on the inner surface of said dial so disposed as to make contact with the electrodes of each cell and to connect said cells in series, two of said films constituting terminals suitably disposed for establishing firm, removable contact with said terminals of said electrical circuitry.

5. An improved watch structure having removable electrical connections between electrical elements on a non-conductive dial and a watch movement in a watch, a plurality of separate metallic films on the inner surface of said watch dial, each connected to an element terminal on the outer surface of said dial, a base plate opposed to and proximate said inner surface of said dial, two electrical circuitry terminals mounted on the surface of said base plate, said circuitry terminals being insulated from each other, and two flexible contact members making firm, removable contact between each of said element terminals and a corresponding circuitry terminal be reason of a pressure exerted by biasing means between the said plate and the said dial.

* * * * *